2 Sheets—Sheet 1.

H. PLUMMER, dec'd.,

PLUMMER SEWING-MACHINE COMPANY, Assignee by mesne assignments.

Guiding and Feeding Devices for Straw Braid Sewing-Machines.

No. 9,082. Reissued Feb. 17, 1880.

Witnesses:
H. N. Low.
H. H. Bliss

Plummer Sewing Machine Company
assignee of Hiram Plummer
William E. Doubleday Prest
by H. A. Doubleday atty

N. PETERS, PHOTO-LITHOGRAPHER, WASHINGTON, D. C.

2 Sheets—Sheet 2.

H. PLUMMER, dec'd.,

PLUMMER SEWING-MACHINE COMPANY, Assignee by mesne assignments.

Guiding and Feeding Devices for Straw Braid Sewing-Machines.

No. 9,082. Reissued Feb. 17, 1880.

Witnesses:
H. N. Low.
J. S. Barker.

Plummer Sewing Machine Co
Inventor:
William E. Doubleday Pres.
by H. H. Doubleday atty

N. PETERS. PHOTO-LITHOGRAPHER, WASHINGTON, D. C.

UNITED STATES PATENT OFFICE.

PLUMMER SEWING MACHINE COMPANY, OF BROOKLYN, N. Y., ASSIGNEE, BY MESNE ASSIGNMENTS, OF HIRAM PLUMMER, DECEASED.

DEVICE FOR GUIDING AND FEEDING STRAW-BRAID SEWING-MACHINES.

SPECIFICATION forming part of Reissued Letters Patent No. 9,082, dated February 17, 1880.

Original No. 93,553, dated August 10, 1869. Application for Reissue filed April 15, 1879.

DIVISION A.

*To all whom it may concern:*

Be it known that HIRAM PLUMMER, now deceased, but formerly of Brooklyn, in the county of Kings and State of New York, did invent certain new and useful Improvements in Guiding and Feeding Devices for Straw-Braid Sewing-Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The invention for which protection is sought in this division of reissue relates to the devices for presenting the braid to the needle as the said braid is formed into successive convolutions in the manufacture of hats.

Another part of the invention, as set forth and described in the original application, relates to the peculiar construction of the feeding-clamp composed of two members; but, as that part of the invention does not form the subject-matter of any of the claims of this division, it need not be specifically described herein.

Figure 1:
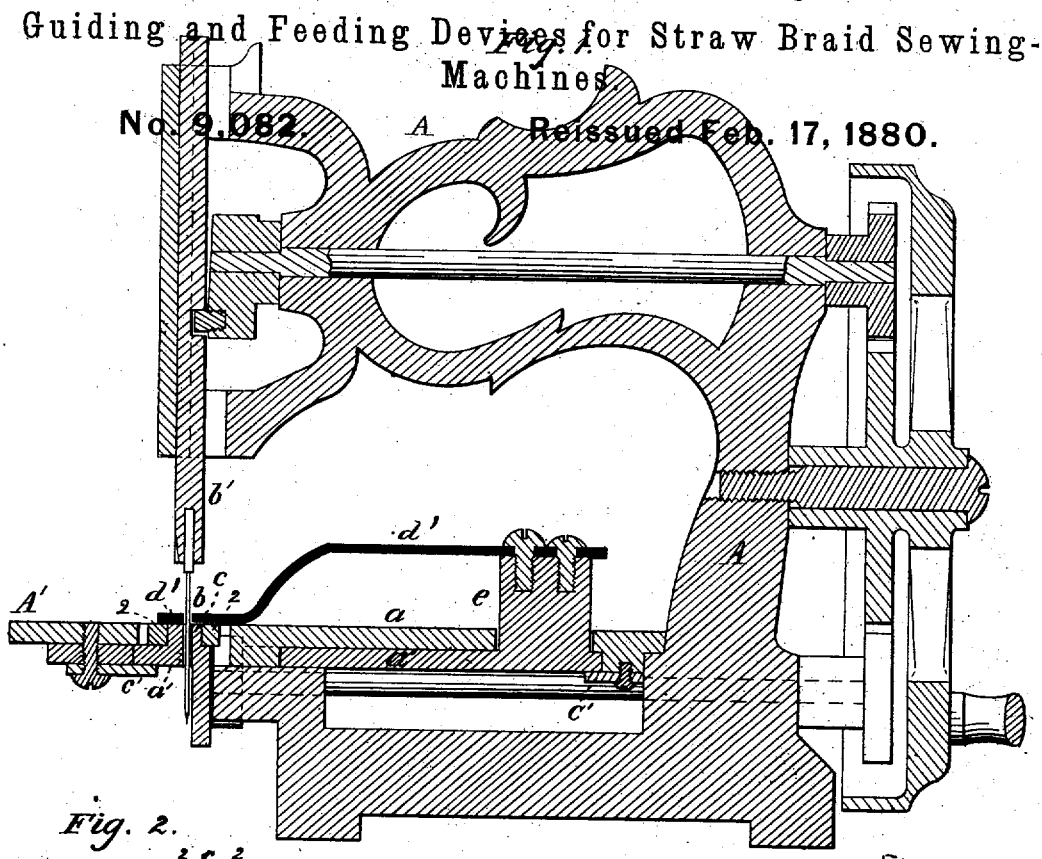
Figure 2:
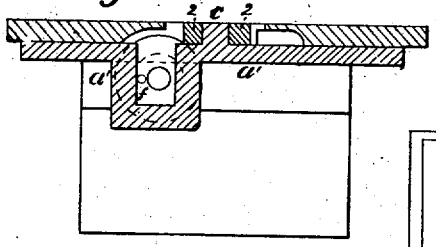
Figure 3:
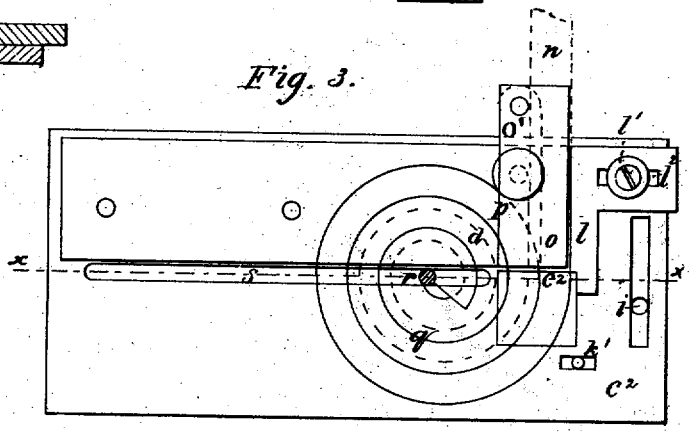
Figure 4:
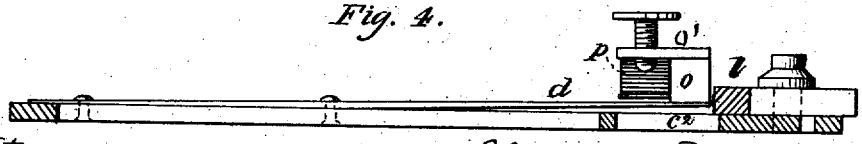
Figure 5:
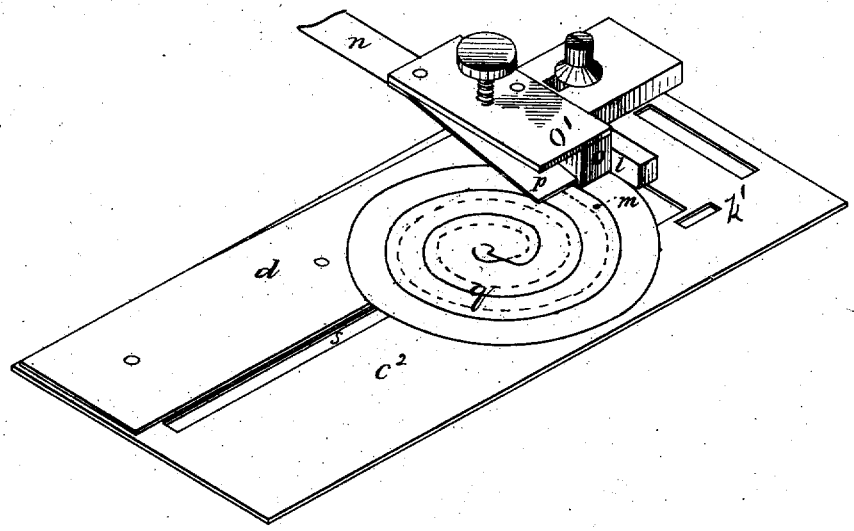

Figure 1 is a vertical section, illustrating the improved feed as applied to sewing-machines. Fig. 2 is a sectional view illustrative of means for giving movement to the feeding mechanism. Fig. 3 is a plan; and Fig. 4 is a sectional view at the line *x*, Fig. 3; and Fig. 5 is a perspective view, detached, of the device shown in Figs. 3 and 4, which constitutes the subject-matter of this division.

Similar letters of reference denote the same parts in all the figures.

Referring to Figs. 1 and 2, *a* is the bed of any sewing-machine, to which my feed may be applicable, A A being the upwardly and forwardly projecting arm or standard which supports the needle *b*, the needle-bar *b'*, and the mechanism which operates them; and wherever in this patent the words "inside the vertical plane of the needle" are used they mean between the arm or standard A and the vertical plane of the needle prolonged to intersect the path traversed upon the bed-plate of the machine by that portion of the unsewed braid which is being fed to the needle; and wherever the words "outside the plane of the needle" are used in this patent they mean between the vertical plane of the axis of the needle and the side or end A' of the bed of the machine.

*a'* is the lower member of the feeding-clamp, and *d'* is the upper member thereof. These are connected together so as to seize the cloth with the desired pressure and be moved together.

I have represented in Figs. 1 and 2 the member *a'* as moving beneath the bed in slides *c'* and connected by the column *e* with the member *d'*, so that they move together, and the motion is communicated by a revolving pin, *f*, in a slot made in the member *a'*. The lower member is shown with a ring-formed bed, 2, around the portion *c* of the member *a'*, that has the slot for the needle, this ring being fitted so as to turn freely and facilitate the turning of the cloth or goods between the upper and lower members of the feeding-clamp, and at the same time present a sufficient bearing-surface for supporting the cloth.

The upper member, *d'*, might be similarly fitted with a ring, if desired.

The feeding-clamp shown in Figs. 3, 4, and 5, upon which the claims in this division are based, is specially adapted for sewing braids or strips of material together in the manufacture of hats and bonnets, and can be applied advantageously to the sewing-machine patented by HIRAM PLUMMER July 14, 1868; but this use is in no manner limited to that machine, but may be applied with other sewing-machines.

The lower member, $c^2$, is made as a plate, and the upper member consists of a thin tongue, and is attached thereto. Both thicknesses of material to be united, if in the form of strips, might pass between the members $c^2$ *d*. These members may be guided by a rib or pin, *i*, on the bed of the machine, entering the slot in the member $c^2$, and the pin or other device employed for reciprocating the device may be applied at the slot *k'*, or other convenient place.

The gage *l* is made adjustable on the member $c^2$ by means of the set-screw $l'$, which passes through a slot, $l^2$, in the gage and into the member $c^2$, so that the distance between this gage and the path of the needle may be adjusted, and one edge of the unsewed strip $n$ of braid runs in contact with this gage as each convolution of braid is added to the sewed fabric, as is plainly shown in Fig. 3.

This device, as before stated, is specially adapted for sewing braids for hats and bonnets, in which case the piece of braid passes in between the members $c^2$ and $d$, as shown, and that portion of the material that has been sewed lies above the member $d$ with its edge against the gage $o$, that is attached to member $d$.

It will be seen by an examination of Figs. 3, 4, and 5 that the gage $o$ is supported above the unsewed braid, and that, while the outer edge of this unsewed braid which is being fed to the needle runs in contact with the gage $l$, the opposite edge of this unsewed braid may project under the sewed fabric to such distance as shall insure a proper lap for the seam.

$p$ is an auxiliary spring-presser acting upon the surface of the sewed fabric represented by coiled crown-piece $q$, as shown. The guide-pin $r$ passes through the center of the coil of braid into the slot $s$ and into a slot in the bed beneath, so that it becomes a center upon which the braid turns as it is sewed up to form the crown-piece, and also a center upon which the clamp can swing as it is moved by the pin in slot $k'$ in feeding the material.

The braid being held by the needle is bent into a curve by the members $c^2$ $d$ and gage $l$ swinging back on the pin $r$ previous to feeding the material forward at the next movement, and the gages $o$ and $l$ maintain a perfectly correct width of braid exposed in the coil. The center pin, $r$, continually working back as the sewing progresses, causes the point on which the members $c^2$ and $d$ swing to be the center of the article being sewed, and at the same time the braid lies closely and correctly against the gages.

In sewing hats the crown-piece can be sewed as aforesaid. The braid will be laid together with great regularity in the spiral form by the gages before described, and when the side of the crown is to be sewed the same is performed by turning up the crown-piece edgewise and sewing the braid as before until the same is of proper size. The crown-piece will be wrong side out, and is to be turned and then the brim sewed upon its edge, the operation being performed as aforesaid.

This feeding device may be fitted with any desired character of guides for turning hems, guiding tucks or plaits, braiding, or performing any other desired character of sewing.

The surface of the members of the feeding-clamp may be smooth or more or less roughened, and the spring-pressure of the clamps may be adjusted, if desired.

I do not claim a sewing-machine feed formed of two members, whether their engaging-faces are plain, circular, roughened, or flat, as these have before been employed, and they have, in some circumstances, moved together.

It will be readily understood that by thus forming the hat by the addition of successive convolutions, commencing at the center crown-piece, upon the machine shown and described in this patent, and having the gages which guide the work to the needle constructed and arranged as shown in Figs. 3, 4, and 5, the hat, during the process of sewing, is always outside the path of the needle, whereby the turning of the same at an angle to the bed of the machine for the purpose of forming the sides of the crown and their manipulations are greatly facilitated.

A guide is shown in a patent to Mary A. Duffey, November 27, 1866, which is constructed in such manner that it could be employed to guide a narrow strip of braid underneath the edge of a wider fabric, and also that in such construction the guide which determines the position of the wider fabric is supported above the path of the narrow strip of braid, and that the guide which determines the position of the strip of braid engages with that edge of said braid which is farthest from the needle, and that both the guides are arranged inside the vertical plane of the needle; but the Duffey is not adapted for the manufacture of hats from strips of braid, because it is constructed with webs or tongues which project horizontally from both the upper and lower edges of the narrow vertical rib against which the edge of the sewed fabric runs. These webs or tongues embrace both sides of the sewed fabric, thereby preventing that portion of the fabric from being turned into the inclined position relative to the bed of the machine which is necessary in order to facilitate forming the side, crown, and brim of the hat, it being readily understood, from the description above given of the method employed by me in shaping a hat, that during various parts of the operation it is essential that both the crown-piece and the sides of the crown should occupy a position substantially parallel with the vertical plane of the needle.

Guides have also been placed inside the path of the needle under such an arrangement as to permit a narrow braid to be sewed to the under side of a wider fabric and to determine the exposed width of the braid; but these last-referred-to guides have been placed in line with the needle, and differ, essentially, from the Plummer construction of devices, in that they have no projecting tongues or plates which can be interposed between the sewed fabric and the unsewed braid in front of the needle, whereas it will be seen that the lower end of his gage is rigidly attached to the plate or tongue which is interposed between the sewed fabric and the unsewed braid in front of the needle, this construction insuring that the edge of the sewed fabric shall be properly guided by the gage *o* without danger of running under said gage or of pressing the gage down upon the unsewed braid which is being fed to the needle.

What is claimed in this division of reissue is—

1. The combination, with the plate $c^2$ and gage *l*, adjustably secured thereto, of a plate or tongue, *d*, secured to the plate $c^2$, and being provided at its free end with a gage, *o*, and spring-presser *p*, whereby the unsewed portion of the braid is guided and placed in proper position with respect to the sewed portion, substantially as set forth.

2. In a mechanism for guiding braids of straw or other material to a sewing-machine in the formation of hats, the combination, substantially as set forth, of the gage *l* to guide the unsewed edge of the strip of braid, the spring-presser, having a bearing upon the upper surface of the fabric as it is being fed to the needle, and the gage *o*, attached to and moving with the spring-presser to guide the edge of the sewed fabric, both gages being arranged inside the vertical plane of the needle.

3. In a mechanism for guiding braids of straw or other material to a sewing-machine in the formation of hats, the combination, substantially as set forth, of the gage *l* to guide the unsewed edge of the strip of braid, the spring-presser, made to bear upon the upper surface of the sewed fabric as it is being fed to the needle, the gage *o*, attached to and moving with the spring-presser to guide the edge of the sewed fabric, both gages being arranged inside the vertical plane of the needle, and the plate or tongue projecting from the lower edge of the gage *o* in front of the needle.

4. In a mechanism for guiding braids of straw or other material to a sewing-machine in the formation of hats, the combination, substantially as set forth, of the gage *l* to guide the unsewed edge of the strip of braid, the tongue or plate *d*, adapted to enter between the sewed fabric and the unsewed braid, and the gage *o*, attached to and rising from the tongue or plate, to guide the edge of the sewed fabric, both gages being arranged within the vertical plane of the needle.

5. In a mechanism for guiding braids of straw or other material to a sewing-machine in the formation of hats, the combination, substantially as set forth, of the gage *l* to guide the unsewed edge of the strip of braid, the gage *o* to guide the edge of the sewed fabric, and provided upon its lower edge only with a plate or tongue, which projects in front of the needle to enter between the sewed fabric and the unsewed braid, both gages being arranged inside the vertical plane of the needle.

In testimony that I claim the foregoing I have hereunto set my hand this 9th day of April, 1879.

WILLIAM E. DOUBLEDAY,
*President of the Plummer Sewing Machine Co.*

Witnesses:
A. A. CAULDWELL,
H. H. DOUBLEDAY.